(12) United States Patent
Caspers

(10) Patent No.: US 12,203,785 B2
(45) Date of Patent: Jan. 21, 2025

(54) MEASURING SYSTEM AND PRESSURE MEDIUM CYLINDER COMPRISING A MEASURING SYSTEM

(71) Applicant: Van Halteren Technologies Boxtel B.V., Boxtel (NL)

(72) Inventor: Leo Caspers, En Eindhoven (NL)

(73) Assignee: Van Halteren Technologies Boxtel B.V., Boxtel (NL)

( * ) Notice: Subject to any disclaimer, the term of this patent is extended or adjusted under 35 U.S.C. 154(b) by 187 days.

(21) Appl. No.: 18/008,063

(22) PCT Filed: Jun. 8, 2021

(86) PCT No.: PCT/EP2021/065332
§ 371 (c)(1),
(2) Date: Dec. 2, 2022

(87) PCT Pub. No.: WO2021/250021
PCT Pub. Date: Dec. 16, 2021

(65) Prior Publication Data
US 2023/0265869 A1 Aug. 24, 2023

(30) Foreign Application Priority Data
Jun. 10, 2020 (DE) .......................... 102020207280.9

(51) Int. Cl.
*H03M 1/22* (2006.01)
*G01D 5/249* (2006.01)
*F15B 15/28* (2006.01)

(52) U.S. Cl.
CPC ........ *G01D 5/2492* (2013.01); *F15B 15/2846* (2013.01); *G01D 2205/10* (2021.05)

(58) Field of Classification Search
CPC .............. G01D 5/2492; G01D 2205/10; F15B 15/2846

(Continued)

(56) References Cited

U.S. PATENT DOCUMENTS 5,905,215 A * 5/1999 Jin et al. ............. F15B 15/2861
73/865.9
2014/0345408 A1 11/2014 Pfeifer et al.

FOREIGN PATENT DOCUMENTS

DE 10119941 A1 10/2002
EP 2561319 2/2014

OTHER PUBLICATIONS

Foreign Communication from a Related Counterpart Application, International Search Report and Written Opinion dated Sep. 14, 2021, International Application No. PCT/EP2021/065332 filed on Jun. 8, 2021.

* cited by examiner

*Primary Examiner* — Jean B Jeanglaude
(74) *Attorney, Agent, or Firm* — Conley Rose, P.C.

(57) ABSTRACT

The linear measuring system includes one part of a (usually steel) rod, beam or strip that is profiled with a trapezium like (subset of a) De Bruijn sequence. Each element of the alphabet is represented by a discrete height of the profile. The profile can be coated with a material with low magnetic susceptibility to enable the application on a piston rod of a pressure medium cylinder. The second part of the measuring system reads the subsequences of the main sequence by using the signals of arrays of linear Hall effect sensors, placed in a magnetic field as input for a signal processing algorithm. With a look-up table, the position of this second part of the measuring system with respect to the profile is determined. An interpolation algorithm can be used to improve the resolution to well below the sequence pitch.

12 Claims, 2 Drawing Sheets

Figure 1:
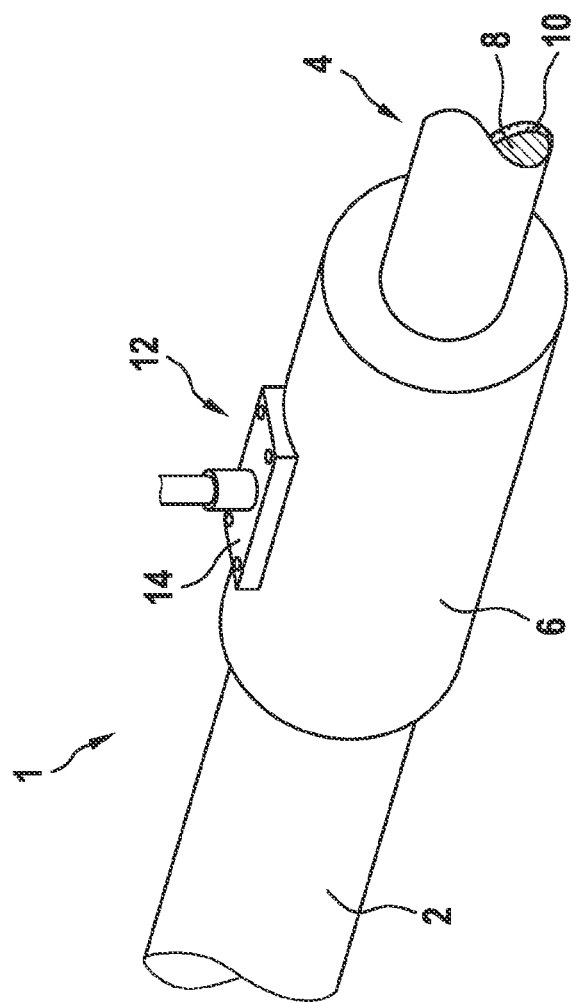

(58) Field of Classification Search
USPC .............................................. 341/1
See application file for complete search history.

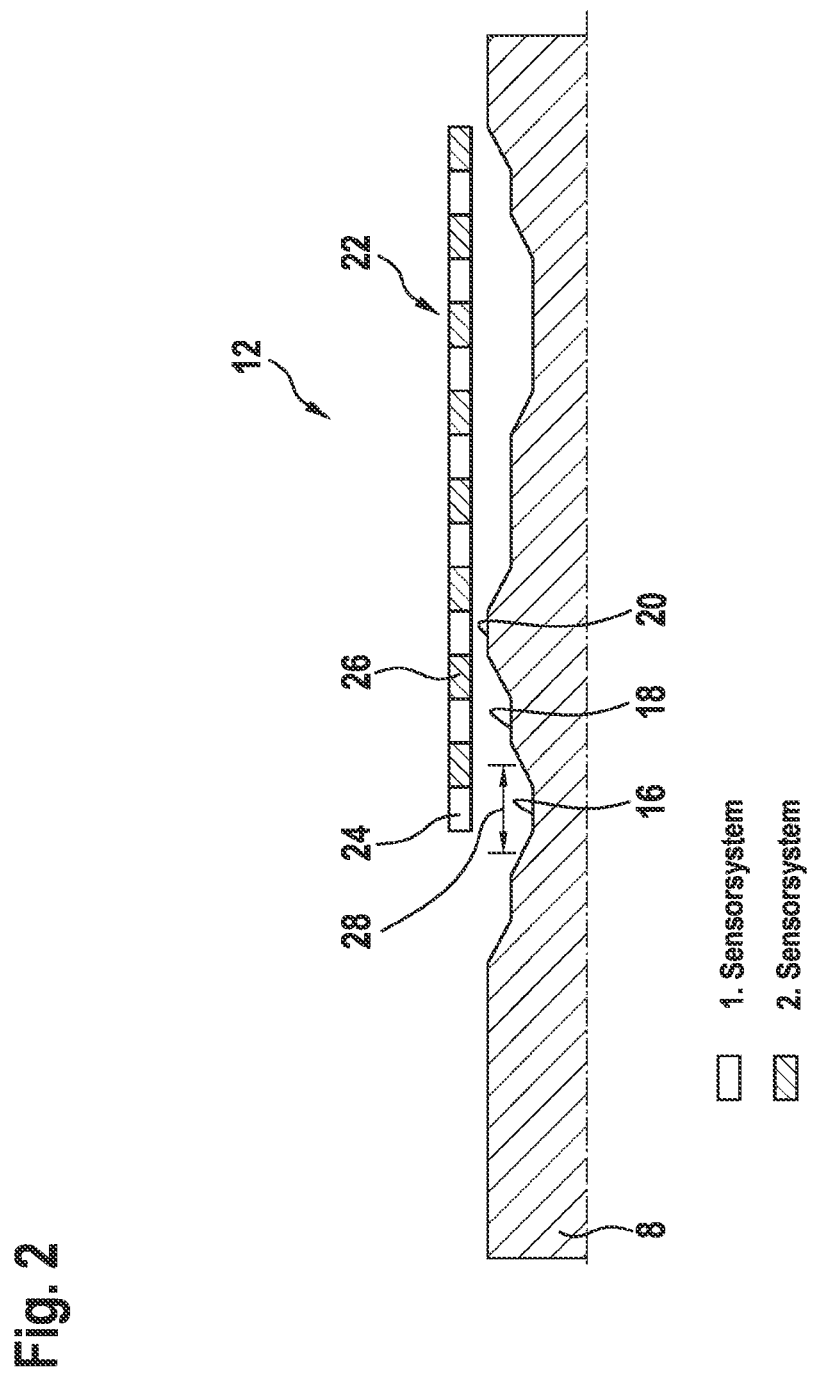

MEASURING SYSTEM AND PRESSURE MEDIUM CYLINDER COMPRISING A MEASURING SYSTEM

CROSS-REFERENCE TO RELATED APPLICATIONS

The present application is a filing under 35 U.S.C. 371 as the National Stage of International Application No. PCT/EP2021/065332, filed Jun. 8, 2021, entitled "Measuring system and pressure medium cylinder comprising a measuring system," which claims priority to German Application No. 102020207280.9 filed with the Intellectual Property Office of Germany on Jun. 10, 2020, both of which are incorporated herein by reference in their entirety for all purposes.

DESCRIPTION

The invention relates to a measuring system according to the generic term of claim 1, and to a pressure medium cylinder with such a measuring system according to claim 12.

For measuring systems, various approaches for determining the absolute position of a piston rod relative to a pressure medium cylinder are known.

In the published document U.S. Pat. No. 7,631,592 B2, a position measuring system for a hydraulic cylinder is known, which system at least one sensor, a magnet, and a piston rod with a metallic core of high magnetic susceptibility and with a groove structure in the substantially axial direction, wherein the groove structure is filled up with a metal which has a lower magnetic susceptibility than the core, so that the sensor measures a magnetic field of the core, which field is changed by the groove structure, and thus the sensor can determine both the relative and the absolute position of the piston rod.

A method for detecting the position and displacement direction of a piston rod of a hydraulic cylinder assembly is known from U.S. Pat. No. 5,905,215 A. The hydraulic cylinder assembly includes a plurality of magnetic sensors for outputting a magnetic field variation signal disposed adjacent to a hydraulic cylinder. A plurality of magnetic sensors cooperate with a plurality of magnetic projections equally spaced along a piston rod member for producing the magnetic field variation signal.

The published document US 2002/0157531 A1 discloses an actuator having a position sensor formed by a helical groove formed in the piston rod. The groove is filled with a material with different magnetic characteristics to provide a smooth exterior surface and a varying discernible signal as the piston rod moves relative to the cylinder. An array of Hall effect sensors is provided around the piston rod to provide phase-shifted signals as the piston rod moves, so that the signal of one sensor can be correlated with signals of other sensors.

DE 101 19 941 A1 discloses a pressure medium cylinder with a measuring system for determining an absolute position of a piston rod with respect to a reference point. The measuring system has a code track, running along the piston rod, of binary code elements and a stationary sensor formed by several sensor elements arranged along the code track and each scanning a limited number of code elements, wherein the code elements form a Manchester code.

The disadvantage of such measuring systems is that the length of the sensor and the area to be scanned, the code track, is very large in its longitudinal alignment along the piston rod, and thus the stroke that cannot be utilized of the piston in the pressure medium cylinder is large. The length of such a sensor makes it inevitable that it is mounted on a special flange, mounted in front of a sealing flange, which leads to an increase in the number of components and thus to an increase in wear parts, and thus to higher costs.

In contrast to this, the invention is based upon the object of creating a measuring system that, with a reduced number of parts, lower costs, and with small installation space, enables a high degree of accuracy in the determination of an absolute position of a piston rod in a pressure medium cylinder. Furthermore, it is an object of the invention to create a pressure medium cylinder with which a measuring system with smaller dimensions is integrated in order to maximize the usable stroke of a piston in a pressure medium cylinder.

These objects are achieved by a measuring system with the features of claim 1 and a pressure medium cylinder with the features of claim 12.

A measuring system according to the invention is designed to determine a position of a piston rod relative to a reference point and has a code track applied to a piston rod. This runs along the piston rod, i.e., with an axial extension along the piston rod. The code track is formed by grooves and plateaus that are introduced radially on a shell surface of the piston rod, i.e., in the circumferential direction, into a base material of the piston rod, and subsequently provided with a protective layer. A stationary sensor system with a plurality of sensor elements arranged parallel to and radially spaced apart from the piston rod is a component of the measuring system. The sensor elements each scan a limited number of code elements. According to the invention, the code elements forming the code track are designed as trinary code elements. In other words, the grooves and plateaus are present in three different planes with respect to the base material, wherein one of the planes may be identical to a plane of the base material, each of which represents an at least trinary code element, wherein a higher-order code element, and in particular one with multiple planes, is also conceivable. Such values are shown below as 0, 1, and 2. Thereby, the code sequence is executed as a De Bruijn sequence, or as a De Bruijn subsequence.

A particular advantage of the design of the measuring system according to the invention is that bandwidth is saved, and the length of the code track is significantly reduced compared to solutions known from the prior art, while the information content remains the same. Furthermore, it is advantageous that a length of the sensor system can be reduced to the length of the code track, so that the cost of the sensor system is reduced accordingly. The length of the code track is at least halved, which results in a significant increase in the stroke and a usable length of the piston. The simplified integration of the sensor system in the measuring system is another beneficial effect.

Further advantageous embodiments of the invention are described in the dependent claims.

Preferably, the sensor elements are designed as linear Hall sensors.

It is particularly advantageous if the pitch of the individual code elements is in a range of 3 mm to 8 mm, and in particular in the range of 5 mm. In the present application, "pitch" is to be understood as the length of a code element in axial extension along the piston rod, wherein a center point of a transition between two code elements serves as the respective reference point.

In one exemplary embodiment according to the invention, two independent sensor systems are provided. A first sensor system and a second sensor system. Both sensor systems are preferably designed with an identical number of Hall sensors, so that both systems are designed to be similar, and in particular identical. Of course, a plurality of sensor systems are also conceivable.

Depending upon the design, it can be advantageous if the sensor elements of a sensor system are arranged in a row in the axial direction. It is particularly advantageous if the individual Hall sensors, i.e., the sensor elements of two sensor systems, are lined up alternately. In other words, the first sensor element of the first sensor system is arranged adjacent to the first sensor element of the second sensor system, followed by second sensor element of the first sensor system, followed by the second sensor element of the second sensor system, and so on.

In an advantageous embodiment, the sensor elements are oriented such that the sensor elements of the first sensor system are located within a pitch of a code element, while the sensor elements of the second sensor system are offset from the code elements. Thereby, the offset is preferably approximately ½ pitch or ¼ pitch and, for an assembly with a plurality of sensor systems, at 1/n pitch. In other words, the sensor elements of the first sensor system are radially spaced apart within a pitch of a code element, and the sensor elements of the second sensor system are radially spaced apart in sections in two adjacent code elements. In the case of a ½ pitch offset, it is ensured that at least one of the sensor systems receive a sufficient signal to determine the absolute position of the piston rod, while, in the case of a ¼ pitch offset, a type of additional detection channel is formed, which channel can be operated as a redundant sensor system. The use of a 1/n pitch offset is particularly advantageous if more than two sensor systems are used.

If the code elements have at most simple jumps, then this advantageous manner in which the base material of the piston rod is not subjected to large internal stresses is achieved. In the present application, a jump is understood to be the transition between two code elements. The possible jumps are 0-0, 0-1, 0-2, 1-0, 1-1, 1-2, 2-0, 2-1, and 2-2. In the present case, the designation 0 is to be understood as the deepest groove, whereas 1 is to be understood as a plateau between 0 and 2, and 2 represents a plateau that is approximately on a plane with the base material of the piston rod. In other words, the 0- and 1-code elements are introduced as grooves in the base material, whereas a 2-code element does not require a recess in the region of the code track. A simple jump is understood to mean that it is one-step—for example, 0-1, 1-2, 2-1, or 1-0. In order to protect the base material of the piston rod and the cover layer with regard to stress peaks, no double jumps, i.e., 0-2 or 2-0 jumps, are provided in the code track. This can also be advantageous in the stability of decoding signals from the sensor systems.

It is particularly preferred if an averaged diameter of the piston rod remains constant over a length of approximately 30 cm, or if changes in diameter over the aforementioned length of the piston are minimal.

In a preferred further development, short sequences of identical code elements are provided. The maximum intended length of a code sequence of identical code elements is to be limited to a maximum of 4 identical code elements, for a code length of eleven code elements. In other words, for example, the sequence 1-0-0-0-0-0-1-2-1-2-1 is not to be used, because five identical code elements follow one another.

In an advantageous embodiment, the sequence of code elements changes at least minimally from one subsequence to the next, further increasing stability.

Another advantageous embodiment has a De Bruijn sequence that has at least one 0 and one 2 in each De Bruijn subsequence with the length corresponding to the number of sensors in a row.

In a particularly preferred exemplary embodiment of the measuring system according to the invention, 0- and 2-code elements are spaced apart as far as possible, wherein both code elements occur in the code track. In other words, at least one 1-code element is provided between each 0- and 2-code element. This further reduces stress peaks in the base material.

A plausibility check of the scanning results is useful for determining the precise absolute position. This can be provided in such a way that, based upon the previously scanned code element and/or the direction of movement of the piston rod along the sensors, the measuring system checks whether the measured position matches previous scanning results. The measuring system is set to the code sequence, so that, if the result deviates from the expected result, this can lead to an error message, since in such a case the absolute position of the piston rod cannot be determined, which could lead to damage during further operation. A kind of emergency stop of an entire system in which the measuring system is installed is conceivable as damage prevention in case of a negative plausibility check.

With a preferred embodiment of the measuring system according to the invention, each sensor system has eleven Hall sensors, wherein these do not have to be designed redundantly, relative to one another. However, reliability can be increased by using redundant sensors, e.g., one or two per sensor row.

A pressure medium cylinder according to the invention is designed with a measuring system described above to determine an absolute position of a piston rod. The stationary sensor system is then arranged on the pressure medium cylinder.

An exemplary embodiment of a measuring system according to the invention is shown in the figures.

The Following are Shown:

FIG. 1 a partial perspective view of a pressure medium cylinder with a measuring system, and FIG. 2 in a schematic cross-section of a cylinder head, the measuring system and the allocation between sensor elements and code elements.

FIG. 1 shows a pressure medium cylinder 1 with a cylinder housing 2. This housing contains a piston known from the prior art, which is not described in detail here. A piston rod 4 is fastened to this. This piston rod exits from a cylinder head 6, wherein the piston rod 4 is sealed inside the cylinder head 6. The piston rod 4 is formed from a base material 8, which can be a steel core, for example, and a thin ceramic or metallic layer 10 applied around the base material—for example, by flame spraying or build-up welding. The layer 10 is not magnetizable, or is so only to a limited extent.

A measuring system 12 with a housing 14 is inserted into the cylinder head 6, wherein the measuring system is designed to detect an absolute position of the piston rod 4. The measuring system 12 is located in a non-pressurized region of the cylinder head 6 between the seal and a scraper.

The base material 8 of the piston rod 4 is provided with an at least partially radially circumferential code track running along the piston rod 4. This code track is formed from individual code elements, which are described in more detail below.

FIG. 2 shows a cross-section through the cylinder head 6 of a measuring system 12 according to the invention. As already indicated above, the base material 8 of the piston rod 4 has a code track. This is formed from a plurality of code elements 16, 18, 20. Furthermore, a sensor assembly 22 is part of the measuring system 12. In the present exemplary embodiment, this assembly is formed from two sensor systems, wherein the first sensor system in this exemplary embodiment has eight sensor elements 24, and the second sensor system also has eight sensor elements 26. The individual sensor elements 24, 26 are designed as linear Hall sensors. Also shown in FIG. 2 is a pitch 28, which represents the length of a code element 16, 18, 20. According to the present exemplary embodiment, a pitch 28 is also the length of two sensor elements 24, 26.

FIG. 2 shows a trinary code track that has the sequence 0-1-2-1-1-0-0-1. The code track is a subsequence and is based upon a De Bruijn sequence, which is distinguished by the fact that each arrangement of a certain number of code elements 16, 18, 20 is present only once in the entire code track. In principle, it can be stated that the smallest arrangement for which the above statement is true is equal to or greater than the number of sensor systems. Accordingly, with the measuring system 12 according to the invention, it would be possible to generate a code track, wherein a sequence of code elements 16, 18, 20 with a length equal to the number of sensor elements 24, 26 in a sensor system occurs only once. However, for manufacturing and/or measurement technology reasons, further measures must be taken into account when generating the code track.

As a general rule, long series of identical code elements 16, 18, 20 should be avoided, and it should be noted that the 0-code elements 16 and the 2-code elements 20 have a comparatively small proportion of the total code track and are not arranged directly adjacent to one another. In other words, 0-2 and 2-0 jumps are to be avoided to protect the protective layer 10 and the base material 8 and the top layer 10 (not shown) in the region of the jumps from avoidable stress peaks.

It should also be noted that a series of identical code elements 16, 18, 20 is maximized in sequence—for example, to four identical code elements 16, 18, 20 for an eight-digit code track. In addition, a continuous trend in one direction, i.e., from 0-code elements 16 to 2-code elements 20, or in reverse order, must be avoided. Rather, the goal should be a constant change between the individual code elements 16, 18, 20.

In the present exemplary embodiment according to FIG. 2, two sensor systems are formed with eight linear Hall sensors 24, 26 each. The sensor elements 24 of the first sensor system have an identical pitch to the code elements 16, 18, 20. The sensor elements 26 of the second sensor system also have an identical pitch. The sensor elements 24 of the first sensor system are radially spaced apart, i.e., opposite one another, within a pitch of the code elements 16, 18, 20, whereas the sensor elements 26 of the second sensor system are arranged at a ½ pitch offset from the code elements 16, 18, 20. In this arrangement, the sensor elements 24, 26 are located directly adjacent to one another. This ensures that at least one of the sensor systems can determine a sufficient signal when the piston rod is displaced. In an exemplary embodiment not shown here, the sensor elements 26 of the second sensor system are located with a ¼ pitch offset from the sensor elements 24 of the first sensor system. This creates a second measurement channel that acts as a redundant sensor system to the first sensor system. If more than two sensor systems are used, e.g., n sensor systems, it is advantageous to arrange the sensor systems with a 1/n pitch offset.

When the piston rod 4 is displaced, the following steps are performed: The signals of all sixteen sensor elements 24, 26 are read out, and a filtering, offset, and gain correction are performed. The determined signals and, if available, the signals from previous measurements, are used in conjunction with the direction of movement of the piston rod 4 in order to determine the position within the code track, and thus track back to the absolute position of the piston rod 4.

When using a De Bruijn code track, no start code elements are necessary, as is the case with a binary code track from the prior art. Furthermore, redundant code elements 16, 18, 20 are not necessary. The length of the code track, in the case of equal or higher information density, is reduced from 0.104 m to 0.033 m, compared to the solutions known from the prior art, which allows a maximum piston length of, for example, 30 m instead of the 26.52 m known. The length of the sensor assembly is also reduced from 0.1352 m to 0.033 m.

A measuring system and a pressure medium cylinder having a measuring system are disclosed.

LIST OF REFERENCE SIGNS

1 Pressure medium cylinder
2 Cylinder housing
4 Piston rod
6 Cylinder head
8 Base material
10 Protective layer
12 Measuring system
14 Housing
16 0-code element
18 1-code element
20 2-code element
22 Sensor assembly
24 Sensor element of the first sensor system
26 Sensor element of the second sensor system
28 Pitch

The invention claimed is:

1. A measuring system for determining the position of a piston rod of a pressure medium cylinder relative to a reference point, wherein the measuring system has a code track that is applied to the piston rod, runs along the piston rod, and is formed by grooves and plateaus running in the circumferential direction in a base material of the piston rod, and wherein the measuring system has at least a first sensor system that is stationary relative to the reference point and has a plurality of sensor elements that are arranged parallel to and radially spaced apart from the piston rod, and wherein each sensor element scans a limited number of code elements, characterized in that, to form the code track, at least trinary code elements are used, which form a De Bruijn sequence and/or a De Bruijn subsequence.

2. The measuring system according to claim 1, characterized in that the sensor elements are designed as linear Hall sensors.

3. The measuring system according to claim 1, characterized in that a pitch of the code elements along the piston rod is between 3 mm and 8 mm, and preferably approximately 5 mm.

4. The measuring system according to claim 1, characterized in that at least a second sensor system is provided.

5. The measuring system according to claim 4, characterized in that the sensor elements of the sensor systems are each arranged in a row, wherein a first sensor element of the first sensor system is arranged next to a first sensor element of the second sensor system, and such arrangement continues with n sensor elements.

6. The measuring system according to claim 3, characterized in that a sensor element of the first sensor system is arranged opposite in the region of a pitch of a code element, and in that a sensor element of the second sensor system is arranged opposite between two code elements with an offset that is approximately a ½ pitch or ¼ pitch, and/or in that a 1/n pitch offset is provided for a plurality of sensor systems.

7. The measuring system according to claim 1, characterized in that the code elements do not have 0-2 and/or 2-0 jumps.

8. The measuring system according to claim 1, characterized in that long sequences of identical code elements are avoided.

9. The measuring system according to claim 1, characterized in that 0- and 2-code elements are arranged as far as possible from one another.

10. The measuring system according to claim 1, characterized in that, upon the scanning of a code element, a plausibility check is performed based upon the previous scanned code element and/or the direction of movement along the sensor elements.

11. The measuring system according to claim 4, characterized in that each sensor system has eleven Hall sensors as sensor elements.

12. A pressure medium cylinder having a measuring system according to claim 1.

* * * * *